Patented May 14, 1929.

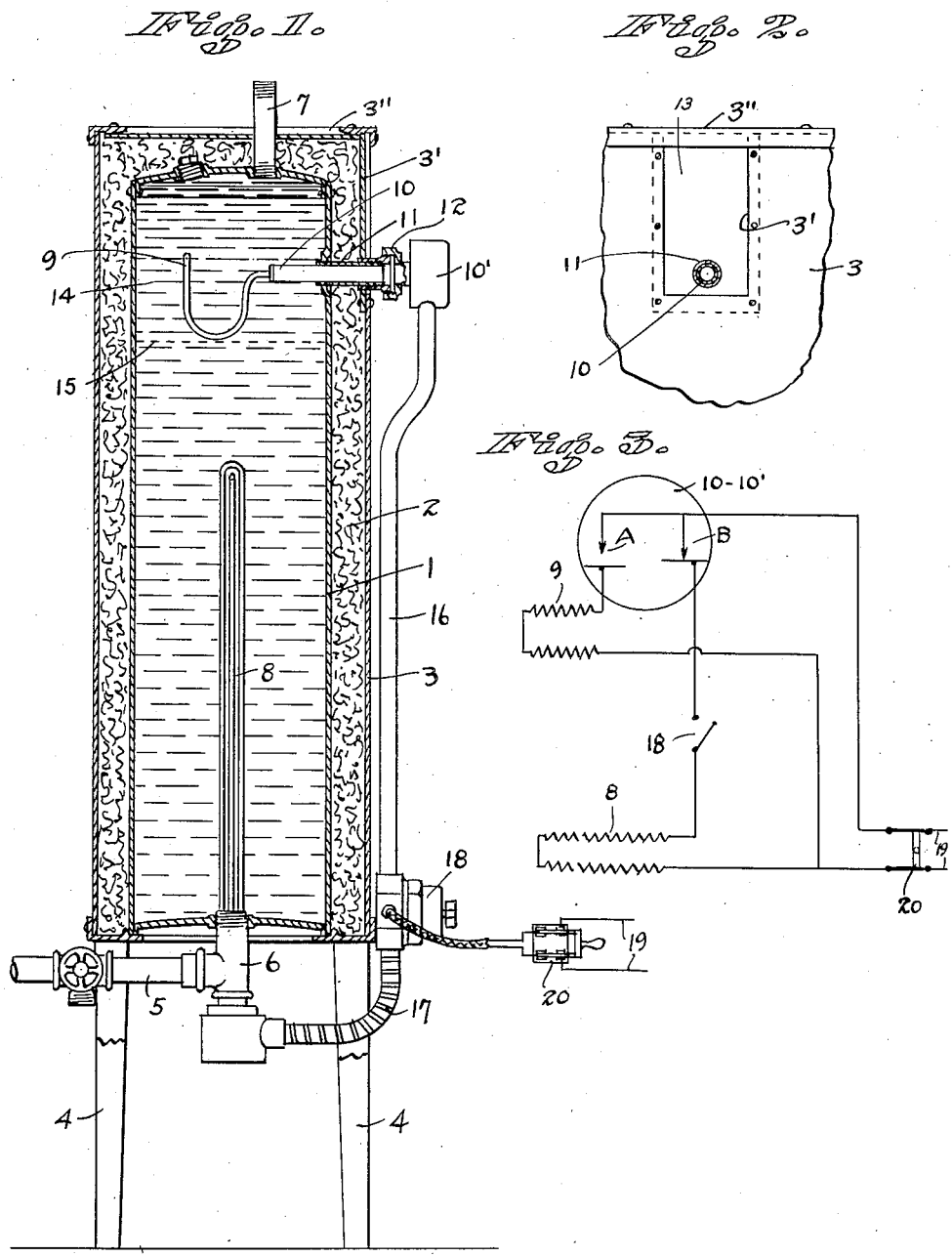

1,712,931

UNITED STATES PATENT OFFICE.

HARRY A. MULVANY, OF SAN FRANCISCO, CALIFORNIA, ASSIGNOR TO ELECTRIC SALES SERVICE CO., OF SAN FRANCISCO, CALIFORNIA, A CORPORATION OF CALIFORNIA.

ELECTRIC WATER HEATER.

Application filed November 29, 1926. Serial No. 151,327.

This invention relates to electric water heaters and particularly to the heating of water in boilers as used for household hot water supply in what is known as the storage system.

The objects of this invention are to provide an electrically heated hot water supply which will take care of the great variation in demands on the system and yet be economical in its operation.

In the drawings hereto, Fig. 1 represents a hot water boiler in vertical section and equipped with apparatus in accordance with my invention.

Fig. 2 is a fragmentary side view of the upper portion of the outer shell of the boiler showing the removable plate for inserting the upper heating element.

Fig. 3 is a diagram showing the electrical circuit as used with the apparatus.

Briefly described, my invention comprises equipping a heat insulated vertical water boiler with a small electric heating element at the upper end and a large element at the lower end, the lower one being on an independent switch but both thermostatically controlled in such a manner whereby the small element always insures a small quantity of hot water at the top of the boiler for immediate use, while the large element is automatically called on when more or a whole boiler full of hot water is required.

By reference to the drawings, 1 indicates a vertical cylindrical household hot water boiler of standard construction lagged with heat insulating material 2, and incased in an outer preferably sheet metal shell 3, the whole being supported on legs as brokenly indicated at 4.

Cold water is supplied to the boiler through a pipe 5 tapped into the heater of the boiler by means of a T 6, and the hot water drawn off through a pipe 7, in the top of the boiler.

Projecting through and properly insulated from the T 6 is an electrical heating element 8 of any desired suitable construction for heating the water and here indicated as a pair of hairpin loops one within the other.

At a point somewhat above the top of heating element 8 is a smaller electric heating element 9 which is extended into the boiler through the side thereof relatively near the top of the boiler, preferably through the standard hot water inlet connection there furnished on standard boilers.

In the arrangement shown, the element 9 extends out of the end of a tubular thermostat 10 in turn mounted within a pipe nipple 11 in turn screwed into the tank flange provided, the outer end of the nipple being screwed into a union member 12, fitting into a hole in a removable plate 13 (see Fig. 2) bolted to and within the casing 3 and covering a slot 3' extending to the top of the boiler so that the whole element and thermostat may be renewed with the plate, if desired, upon lifting the cover 3'' of the casing.

The small heating element 9 is of pliable construction so that it may be easily bent and it is shaped before insertion to a downwardly extending goose neck form as shown so as to define any desired lower limit (within the length of the element) in the water 14, as the limit designated by the dotted line 15, to which it is desired to heat the water with the upper element.

The small upper element 9 shown in the drawings as bent to the form of a loop or goose-neck, may, by reason of the removable panel 3' in the outer casing easily be worked through the hole in the boiler without getting it out of shape, as it is small in diameter relative to the hole and the unscrewed nipple 11 may be bodily moved up or down and turned about to accomplish the desired end, if necessary some of the insulation 2 may be removed immediately surrounding the point of insertion of element 9 so as to have no interference from this source. The element when in the boiler may be adjusted to control the depth of heating of the upper zone of water above dotted line 15 by simply turning the nipple 11 a fractional turn in its screw thread so as to thereby bodily swing the goose-neck upward from the lowest position shown in the drawing.

The upper element is automatically electrically connected and disconnected to power wires from the conduit 16 by suitable thermostat contact mechanism contained within the thermostat base 10' not involved in the present invention, and the lower element is connected to power wires in conduit 17 leading to the switch 18 to which the incoming leads 19 are brought and thence to another contact within the thermostat base 10' preferably set to operate by the same thermostat at a somewhat higher temperature than the contact operating the upper element.

The circuit diagram in Fig. 3 clarifies the above and shows the main leads 19 controlled by a switch 20 and the other connections described, the thermostat 10—10' being shown with two contacts, one A controlling the upper element set for say 150 degrees F. and the one B controlling the lower element set for 160 degrees F.

In an ordinary household water boiler, the electrical capacity of the upper and lower heating elements is made respectively about 1000 and 5000 watts.

In operation of the above apparatus, the main switch 20 being closed causes the current to heat the upper element until the water down to line 15 reaches 150 degrees and since no circulation below this point is provided the water acts as a heat insulator and the thermostat operates to maintain this much water heated to 150 at all times so that two or three gallons (depending on the bend in the element 9) of hot water is always instantly available and no energy is wasted in heating the balance of the boiler.

However, when a large quantity of hot water is wanted, as for filling a bath tub, the switch 18 is closed and the relatively large lower heating element 8 brought into operation with a result that the water heated by it will rise until it strikes the hotter stratum at 15 after which it will descend for further heating until it exceeds 150 degrees to thereupon mingle with the upper hot water previously heated by element 9 and so continue until the whole is raised to 160 degrees whereupon the contact B is broken and both elements are cut out. The small element set for 150 degrees remaining out of use while the larger one responds to any drop in temperature so as to maintain all to 160 degrees until the switch 18 is opened, and upon which the small element again takes control of the upper part of the boiler as at first to maintain the relatively small quantity of water heated for small demands such as washing the hands, dishes, etc.

The cold water entering at the bottom through the T 6 around the larger heating element insures a rapid circulation of the water from the element when the lower element is heated and water is being drawn off for use.

In contemplating my invention as set forth it will be manifest that many minor changes in the arrangement may be made without affecting the operation described, and while I prefer to make the upper element and thermostat for insertion as a unit it is evident that they will operate if separately inserted providing they are substantially in the same water zone.

I claim:

1. A water heater comprising an upright cylindrical water container provided with water inlet and discharge openings, an electric heating element extending into the upper portion of the container adapted for independently heating the water in said upper portion, means whereby said element is adjustable to different points of elevation in the container to control and predetermine the depth of the upper zone of hot water, and an electric heating element of greater capacity arranged within the container for heating the water in the lower portion of the container.

2. A water heater comprising a vertically arranged cylindrical water boiler provided with a water inlet and a water outlet, a minor electric heating element extending into the upper portion of the boiler and a major electric heating element extending into the lower portion of the boiler,—thermostatic means actuated by the temperature of the upper part of the boiler arranged for controlling the minor heating element at a given temperature and the major heating element at another temperature.

3. A water heater comprising a vertically arranged cylindrical water boiler provided with a water inlet and a water outlet, a minor electric heating element extending into the upper portion of the boiler and a major electric heating element extending into the lower portion of the boiler,—thermostatic means actuated by the temperature of the upper part of the boiler arranged for controlling the minor heating element at a given temperature and the major heating element at a higher temperature.

4. In a water heater of the character described, minor means for heating an upper zone of water to a given temperature, major means for heating a lower zone to a higher temperature, means actuated by the higher temperature adapted for cutting out said major means and by said given temperature for cutting out said minor means.

5. A water container, an electrical heating element extending horizontally into said container, a shank on said element revolvable with respect to the container, and said element offset from the axial line of said shank within the container whereby upon revolving the shank the element may be bodily raised and lowered within the water.

HARRY A. MULVANY.